3,281,399
CATALYST RESIDUE REMOVAL
Samuel Renaudo and Richard E. Dietz, Bartlesville, Okla., assignors to Phillips Petroleum Company, a corporation of Delaware
No Drawing. Filed Apr. 1, 1963, Ser. No. 269,772
14 Claims. (Cl. 260—88.2)

This invention relates to the removal of catalyst residues from polymers. In one aspect, this invention relates to a method for the removal of catalyst residues by combination of alkylene oxide and solid absorbent bed treatment of a polymer solution. In another aspect this invention relates to a method for the removal of catalyst residues by combination of alkylene oxide, a dicarbonyl compound, and a solid bed treatment.

Various reactions for polymerizing olefins are described in literature, and the polymerizations usually are carried out in the presence of catalysts. One of the problems encountered with polymers prepared by such processes concerns the presence of catalyst residues in the polymer, or ash-forming ingredients. The "ash content" of a polymer refers to the inorganic constituents which are present in the polymer in unidentified form and which produce ash when the polymer is burned. The presence of these catalyst residues in the polymer adversely affects the color and heat stability of the polymer as well as its electrical properties.

It is thus an object of the present invention to provide an improved process for producing polymers of olefins having a low ash content. Another object of the present invention is to provide a process for treating polymers in order to remove catalyst residues associated therewith. A still further object of the invention is to provide a process for polymerizing olefins wherein the polymerization effluent containing liquid monomer and polymer in solution is treated so as to remove catalyst residues. Other aspects, objects and the several advantages of the invention will be apparent to those skilled in the art in view of the disclosure and the appended claims.

A widely used procedure for the production of olefin polymers involves contacting the monomer(s) with a catalyst which forms on commingling a compound of Group IV, V, VI or VIII and a compound selected from the group consisting of organometal compounds, metal hydrides and metals of Group I, II, or III of the Periodic system. However, when so operating, greater or lesser amounts of metal residues from the catalyst system remain in the polymer, and for some applications such residues lead to objectionable color developments and other detrimental properties in finished articles fabricated therefrom. The present invention is applicable to the removal of catalyst residues from olefin polymers containing same, the operation being directed to treatment of the polymer while in solution. The invention is particularly applicable to the treatment of polymer solutions from solution polymerization processes and can be conveniently integrated therewith in a manner such that the product from such an integrated operation is recovered substantially free from catalyst residues.

In accordance with one aspect of the present invention, a small quantity, generally from about 1.5 to 5.0 times the stoichiometric amount for reaction with the metals of the catalyst, of an alkylene oxide is mixed with the polymer solution by stirring the mixture for about 5 minutes to about 2 hours at a temperature level at which the polymer remains in solution, generally in the range between 120 and 300° F., then passing the solution over a bed of an activated absorbent clay, preferably bauxite or alumina, at a similarly elevated temperature. Other absorbent clays such as montmorillonite, bentonite, kalolinite, kieselguhr, and the like also are usable. Prior to contacting with the alkylene oxide-containing polymer solution, the clay treating agent is activated by heating in a stream of air at a temperature in the range of 500–1000° F. for about 10 minutes to 6 hours and purging with nitrogen or other inert gases. Contact time of the solution with the clay bed will be in the range of about 1 to about 20 minutes. From the clay treatment, the solution is passed to a recovery zone where the polymer is isolated by suitable means such as by stripping or flashing to remove solvent therefrom.

In accordance with another aspect of the present invention, the polymer solution is treated with a mixture of alkylene oxide and a dicarbonyl compound of the Formula (a)

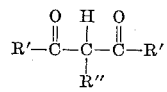

and of the Formula (b)

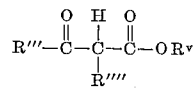

and then passed over an activated sorbent bed. In compound (a) each $R'$ can be alkyl, cycloalkyl, aryl, aralkyl, alkaryl, alkylcycloalkyl, or cycloalkylalkyl group or the $R'$s can be joined to form a cyclic structure and $R''$ can be hydrogen or an alkyl, cycloalkyl, aryl, alkaryl, aralkyl, alkylcycloalkyl, cycloalkylalkyl group, the number of carbon atoms in each $R'$ and $R''$ being from 1 to 8.

In compound (b), $R'''$ is an alkyl, cycloalkyl, aryl, aralkyl, alkaryl, alkylcycloalkyl, cycloalkylalkyl group or an $OR^v$ group; $R''''$ is hydrogen or a hydrocarbon group as defined for $R'''$; and $R^v$ is a hydrocarbon group as defined for $R'''$, the number of carbon atoms in $R'''$, $R''''$, and $R^v$ being from 1 to 8.

Typical of such compounds are 2,4-pentanedione (acetylacetone), 2,4-hexanedione,
2,4-heptanedione, 5-methyl-2,4-hexanedione,
2,4-octanedione, 5,5-dimethyl-2,4-hexanedione,
3-ethyl-2,4-pentanedione, 2,2-dimethyl-3,5-nonanedione,
1-cyclohexyl-1,3-butanedione,
5,5-dimethyl-1,3-cyclohexanedione,
1-phenyl-1,3-butanedione,
1-(4-biphenylyl)-1,3-butanedione,
1-phenyl-1,3-pentanedione,
1-phenyl-5,5-dimethyl-2,4-hexanedione,
1,3-diphenyl-1,3-propanedione,
1,4-diphenyl-1,3-propanedione,
1,4-diphenyl-1,3-butanedione,
1-phenyl-2-benzyl-1,3-butanedione,
1-phenyl-3-benzyl-9,11-nonadecanedione,
8,10-heptadecanedione,
8-ethyl-7,9-heptadecanedione,
6-octyl-5,7-undecanedione,
4-phenyl-3,5-heptanedione,
1,3-cyclohexanedione,
ethyl acetoacetate,
methyl acetoacetate,
n-propyl acetoactate,
isopropyl acetoacetate,
tert-butyl acetoacetate,
diethyl malonate,
dimethyl malonate,
di-n-propyl malonate,
diisopropyl malonate,
di-tert-butyl malonate,
octyl acetoacetate,
heptyl acetoacetate,
phenyl acetoacetate,
diphenyl malonate, dicyclohexyl malonate,
dicyclohexyl octylmalonate,
dihexyl phenylmalonate,
ethyl 3-oxopentanoate,
octyl-3-oxoundecanoate,
methyl 3-oxo-4-phenylbutanoate,
ethyl 3-oxo-5-phenylpentanoate,
octyl 3-oxo-2-phenylundecanoate,
octyl 3-oxo-2-octylundecanoate,
cyclohexyl 3-oxo-6-cyclopentylhexanoate, and the like.

As mentioned hereinbefore, other polymers which are treated in accordance with the present invention are prepared from mono-1-olefins. The present invention is applicable to the treatment of polymers which are prepared by polymerizing olefinic compounds including mono-1-olefins and diolefins containing 2 to 20 carbon atoms. Examples of such monomers include ethylene, propylene, 1-butene, 1-pentene, 3-methyl-1-butene, 1-hexene, 1-heptene, 1-octene, 4-methyl-1-pentene, 3-methyl-1-hexene, 4-vinylcyclohexene, 1-eicosene, 4-ethyl-1-octadecene, 6-methyl-1-dodecene, 1,3-eicosadiene, 4,6-diethyl-1,3-decadiene, 4,5-dimethyl-1-octene, 1-hexadecene, 1,3-butadiene, isoprene, 2,3-dimethylbutadiene, 2-methoxybutadiene, and the like. This invention is particularly applicable to the treatment of polymers prepared in solution type polymerization, such as 1-butene and propylene, to remove catalyst residues. It is to be understood that mixtures of two or more monomers can be employed in the polymerization to produce copolymers which are then treated by the present process. Examples of such copolymers include 1-butene-1-hexene and 1-butene-1-pentene.

This invention is applicable to the treatment of polymers prepared by the use of catalyst compositions which form on mixing two or more components, one of which is a compound of a metal selected from Groups IV, V, VI and VIII of the Periodic Table according to Mendeleef, the second component being selected from the organometal compounds, metal hydrides and metals of Groups I, II and III of the Periodic Table. Numerous examples of these catalyst compositions are well known in the art.

Examples of the second-mentioned component which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, methylaluminum dichloride, ethylaluminum dichloride, diethylaluminum chloride, di-n-butylaluminum bromide, isooctylaluminum diiodide, di-n-propylgallium fluoride, eicosylgallium dibromide, ditetradecylgallium fluoride, dicyclohexylgallium chloride, diphenylgallium bromide, diphenylindium chloride, dioctylindium fluoride, cyclohexylindium dibromide, 3-methylcyclohexylaluminum dichloride, 2-cyclohexylethylgallium dichloride, p-tolylberyllium iodide, di-(3-phenyl-1-methylpropyl)indium fluoride, 2-(3-isopropylcyclohexyl)ethylthallium dibromide, and the like.

The metal hydrides can include, as specific examples, aluminum hydride, lithium aluminum hydride, barium hydride, gallium hydride, indium hydride, potassium beryllium hydride, and sodium hydride.

The metals of the first, second and third groups are applicable as a class, the most important members being sodium, magnesium, and aluminum.

The compounds of a metal of Groups IV, V, VI and VIII of the Periodic system include the oxides, hydrides, halides, oxyhalides and salts of organic acids, usually having twenty or less carbon atoms, such as formic acid, of the said groups of metals usch as titanium, zirconium, chromium, thorium, molybdenum and vanadium.

The alcoholates of a metal of Group IV of the Periodic System which can be employed to conform to the formula $X_nM(OR)_m$, where $m+n$ equals the valence of the metal M, X is a halogen, and R is an organic radical usually having 20 or less carbon atoms and preferably being an alkyl, cycloalkyl or aryl group. Specific examples of such alcoholates are titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetracyclopentyl titanate, tetraethyl zirconate, tetramethyl zirconate, tetraisopropyl zirconate, tetraamyl zirconate, dichloro diethyl titanate $(Cl_2Ti(OC_2H_5)_2)$, monochloro triethyl titanate $(ClTi(OC_2H_5)_3)$, and dichloro diethyl zirconate $(Cl_2Zr(OC_2H_5)_2)$. Also included are such compounds as $Hf(OCH_3)_4$, $Th(OC_3H_7)_4$, $Th(OC_6H_5)_4$,
$Cl_3Ti(OC_6H_4CH_3)$, $Zr(OC_4H_7)_4$, $Cl_2Hf(OC_{10}H_{21})_2$,
$Th(OC_6H_{13})_4$, and $Zr(OC_{12}H_{25})_4$ A third catalyst component which can be advantageously used is an organic halide or organometal halide where the organic radical has 30 or less carbon atoms and is advantageously an alkyl, cycloalkyl or aryl group. Specific examples are ethyl bromide, ethyl trichloro titanium, bromobenzene, cyclohexyl chloride, and the like. Also applicable are an alkali metal or ammonium halide, an aluminum halide (where the catalyst also includes another metl compound such as a titanium compound), a halogen, a hydrogen halide, a complex hydride, a mixture of an organic halide and a metal, and Grignard reagent.

A still more specific subgroup of catalysts wherein the practice of the invention obtains excellent color and low ash content includes catalysts using an organometal compound in combination with a metal salt. The ratios of the catalyst components can vary widely depending upon the particular charge used and operating conditions, from about 0.02 to 50 mols of the first component per mol of the second catalyst component. If a third component is present, the amount can vary from 0.02 to 50 mols per mol of the second component.

Examples of suitable catalyst systems in accordance with the foregoing disclosure are:

(a) Aluminum trialkyls, e.g. triethylaluminum or triisobutylaluminum, and the tetravalent metal halides of the type represented by titanium tetrachloride;

(b) An organic halide (such as ethyl bromide), a Group IV inorganic halide (such as titanium tetrachloride), and a low valence metal selected from the group consisting of alkali metals, beryllium, magnesium, zinc, cadmium, mercury, aluminum, gallium, indium and thallium, for example magnesium, ethyl bromide and titanium chloride, as such or with the addition of metallic aluminum;

(c) A group IV halide, for example titanium tetrachloride, and a low valence metal identified in (b), for example sodium or magnesium;

(d) A mixture of titanium hydride and an aluminum halide, i.e., a mixture of titanium hydride and ethylaluminum sesquichloride;

(e) An organoaluminum halide such as diethylaluminum chloride and a trivalent metal halide such as titanium trichloride;

(f) A mixture of molybdenum pentachloride and organometal compounds and halides exemplified by triethylaluminum and ethylaluminum dichloride;

(g) A mixture of complex metal halides, exemplified by potassium fluotitanate, and an organometal compound and halides exemplified by triethylaluminum and diethylaluminum chloride;

(h) A mixture of a derivative selected from the oxides of molybdenum, alkali metal and ammonium molybdates, and an organometal halide exemplified by isobutylaluminum dichloride;

(i) A mixture of a derivative of iridium, platinum and osmium selected from the group consisting of halides, oxides and complex compounds of iridium platinum and osmium, said complex compounds corresponding to the formula $M_xM'X_y$, wherein M is an alkali metal or an ammonium radical, M' is iridium, platinum or osmium, X is a halogen, y is at least 1 and the sum of x and y is equal to the valence of M', and a metallic organic compound exemplified by triethylaluminum, for example iridium chloride and triethylaluminum or ethylaluminum sesquichloride;

(j) A mixture of a derivative of a Group IV metal selected from the group consisting of halides, oxyhalides, hydroxyhalides, oxyhydroxyhalides of a metal selected from the group consisting of molybdenum, tungsten, uranium, selenium, tellurium and polonium, and complex salts of said halides and said oxyhalides with a member selected from the group consisting of halides of sodium, potassium, lithium, rubidium, cesium and ammonia, and an organometal compound exemplified by triethylaluminum, for example molybdenum pentachloride and ethylaluminum dichloride;

(k) A chromyl halide and at least one of the following: (1) a metal hydride or an organometal compound, (2) an organometal halide, and (3) a mixture of an organic halide and a metal, for example chromyl chloride, ethyl bromide and magnesium;

(l) (1) A titanium derivative, (2) a complex hydride and (3) a halide of aluminum, for example tetrabutyl titanate, lithium aluminum hydride and aluminum chloride;

(m) At least one halide of titanium, zirconium or hafnium and at least one hydride of lithium, sodium, potassium, rubidium, cesium, magnesium, calcium, strontium, barium, lanthanum or thorium, for example zirconium tetrachloride and calcium hydride;

(n) (1) A hydrocarbon derivative of one of the metals zinc, cadmium, mercury and magnesium and (2) a member selected from the group consisting of halides of titanium, zirconium, vanadium and molybdenum, oxyhalides of titanium, zirconium, vanadium, molybdenum and chromium, and complex salts of said halides and oxyhalides with a member selected from the group consisting of halides of the alkali metals and ammonia, for example diethylzinc and titanium tetrachloride;

(o) (1) A tri- or tetrahalide of titanium, zirconium, hafnium and germanium, (2) an organophosphorus-containing compound, and (3) at least one of the following: (a) an organometal halide, (b) a mixture of an organic halide and a metal, and (c) a complex hydride, for exmple triethylaluminum, titanium tetrachloride and triphenyl phosphine;

(p) (1) A tri- or tetrahalide of titanium, zirconium, hafnium and germanium, (2) a peroxide of the formula R'OOR' where R' is a hydrogen, alkyl, aralkyl, alkaryl, cycloalkyl, acyl, alkyne, or aryl and (3) at least one of the following: (a) an organometal halide, (b) a mixture of an organic halide and a metal, and (c) a complex hydride, for example ethylaluminum sesquichloride, titanium tetrachloride and benzoyl peroxide;

(q) (1) A tri- or tetrahalide of titanium, zirconium, hafnium and germanium, (2) a metal alkoxide, and (3) at least one of the following: (a) an organometal halide, (b) a mixture of an organic halide and a metal, and (c) a complex hydride, for example ethylaluminum sesquichloride, aluminum ethylate and titanium tetrachloride;

(r) (1) A halide of titanium, zirconium, hafnium or germanium, (2) a hydride selected from the group consisting of hydrides of aluminum, gallium, indium and thallium and complexes of said hydrides with alkali metal hydrides, and (3) an organic halide, for example titanium tetrachloride, lithium aluminum hydride and ethyl bromide;

(s) (1) A halide of titanium, zirconium, hafnium or germanium, (2) carbides and acetylenic compounds, and (3) at least one of the following: (a) an organometal halide, (b) a mixture of an organic halide and a free metal, and (c) a complex hydride, for example ethylaluminum sesquichloride, titanium tetrachloride and copper acetylide.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal halide falls within the range of 0.02 to 50.

Although not essential, it is often desirable to carry out the polymerization in the presence of elemental hydrogen.

The alkylene oxides used in the process of the present invention are compounds containing from 2 to 8 carbon atoms and which include in their molecular structure at least one oxirane group having the structure

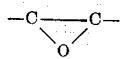

These compounds can be represented by the general formula:

wherein each R and each R' are selected from the group consisting of hydrogen, alkyl, cycloalkyl, aryl, an epoxy-substituted cyclic radical, or an epoxy-substituted alicyclic group; and wherein R and R' can be joined to form a carbocyclic group.

Typical compounds of this type include: epoxyethane, 1,2-epoxypropane, 1,2-epoxybutane, 2,3-epoxybutane, 1,2,3,4-diepoxybutane, 1,2,4,5-diepoxypentane, 1,2,4,5,7,8-triepoxyoctane, 2,3-epoxy-2,3-dimethylbutane, 2,3-epoxy-2-methyl-3-ethylpentane, epoxyethylbenzene, epoxyethylcyclohexane, epoxyethyl-3,4-epoxy-cyclohexane, 1,2-epoxycyclohexane, 2,3-epoxyethylcyclohexane, 1,2-epoxycyclopentane, and the like. The presently preferred alkylene oxide is propylene oxide.

The process of the invention is particularly adaptable for the treatment of polymers prepared in solution-type mass polymerization, i.e. those in which a portion of the monomer serves as the diluent and the polymer is soluble therein at the reaction temperature. Suitable monomers of this type are 1-butene, 1-pentene, 1-hexene and mixtures thereof. Catalyst systems suitable for such operations are broadly as set forth above. The presently preferred catalyst comprises a mixture of the reaction product of titanium tetrachloride and aluminum, and diethylaluminum chloride. Frequently it is desirable to conduct the polymerization in the presence of elemental hydrogen which serves as a control for molecular weight.

The process also is useful for the treatment of polymers of ethylene, propylene or copolymers of these monomers with each other or with other 1-olefins, the reaction being conducted as a solution operation in a suitable diluent such as cyclohexane at a temperature level such that the polymer product is obtained as a solution therein. Likewise, polymers of conjugated diolefins prepared in solution operations using heterogeneous catalyst systems of the class set forth above can be treated by the process of the invention to provide an essentially metal-free product.

While the present process is particularly applicable to treatment of polymers obtained as solutions from solution-type operations, it can be employed either as mass systems or with an extraneous diluent for removal of catalyst residues from solid polymers obtained from slurry-type operations by heating the slurry until the polymer dissolves or by recovering the polymer and dissolving it in a suitable solvent after which the operation is conducted as described.

When necessary after continued use, the clay employed in the process can be regenerated by heating at 500° F. or higher in the presence of a stream of air or oxygen. By so operating, organic materials are burned away and metals present are converted to oxides which are not detrimental to further use in the process.

7

A more comprehensive understanding of the invention can be obtained by referring to the following illustrative examples which are not intended, however, to be unduly limitative of the invention.

Example I

Copolymerization of 1-butene with 1-hexene was conducted at 140° F. in a one-gallon stainless steel autoclave, using as catalyst 0.10 gram of the reaction product of titanium tetrachloride and aluminum and 0.59 gram of diethylaluminum chloride. Two liters of a mixture of 95 weight percent 1-butene and 5 weight percent 1-hexene, measured under pressure of 100 p.s.i.g., was charged and the reaction allowed to proceed for a period of 2 hours in the presence of 0.079 mol (0.158 gram) of elemental hydrogen. At the end of the run, 3.888 grams (4 stoichiometric equivalents) of propylene oxide was added to the reaction mixture, which was then stirred at 150° F. for 1 hour. The polymer solution was then passed through a bed of 3/16" pelletized bauxite, previously activated by heating for 4 hours at 600–700° F. in a stream of air followed by a nitrogen purge. After the polymer solution was removed from the bauxite treater, unreacted monomers were removed in a flash zone and the solid polymer recovered and dried in a vacuum oven at 180° F. for 3 hours. Analyses of this polymer and of a control made in the same manner using no propylene oxide are shown below.

TABLE I

| Propylene Oxide | | Analysis (p.p.m.) | | | |
|---|---|---|---|---|---|
| Gr. | Stoic. Equiv.[1] | Ti | Al | Fe | Ash |
| 3.888 | 4 | 0 | 5 | 0 | 63 |
| None | | 152 | 33 | 8 | 568 |

[1] Stoichiometric values are calculated on the basis of 3 mols propylene oxide per gram atom of titanium and aluminum in the catalyst charge.

These data show that by the method of the invention, titanium and iron were completely removed, aluminum reduced by at least 85 percent, and ash by 89 percent.

Example II

Propylene was polymerized in a one-gallon stirred reactor in the presence of a catalyst comprising diethylaluminum chloride and the reaction product of titanium tetrachloride and aluminum, using the following recipe and conditions:

| | |
|---|---|
| Propylene, liters | 3.0 |
| Al-TiCl₄ reaction product, gm. | 0.420 |
| Diethylaluminum chloride, gm. | 0.79 |
| Hydrogen, mol percent (on propylene) | 0.50 |
| Temperature, °F. | 120 |
| Time, hours | 2 |

The unreacted propylene was vented and the polymer dissolved in normal heptane at a temperature at 200° F. together with 2.0 stoichiometric equivalents of 2,3-epoxybutane and 1.5 stoichiometric equivalents of acetylacetone. This solution was stirred for 15 minutes and then passed through an adsorbent bed containing 20–40 mesh activated clay at a temperature of 200° F. and at a flow rate of 15 volumes of solution per volume of clay per hour. The treated solution was then cooled and the polymer separated by filtration, washed on the filter with normal pentane and dried, after which titanium, aluminum and total ash were determined. Substantial reduction in these catalyst contaminants was effected by treating the polymer with an alkylene oxide and a dicarbonyl compound acetylacetone, followed by a solid absorbent bed, bauxite, treatment.

Reasonable variations and modifications are possible within the foregoing disclosure without departing from the spirit or scope thereof.

We claim:

1. A method of removing catalyst residues from a polymer prepared by catalytic polymerization in the presence of a catalyst which forms on commingling at least two essential components, one of said components being a metal compound selected from the group consisting of Groups IV, V, VI and VIII metal compounds and another of said components being selected from the group consisting of organometals, metal hydrides and metals of Groups I, II and III, which consists of contacting said polymer present in solution with a treating agent comprising an alkylene oxide having from 2 to 8 carbon atoms at a temperature such that the polymer will not be degraded for a time ranging from 5 to 120 minutes, passing the resulting treated polymer solution over a bed of an activated sorbent, and recovering the thus treated polymer from the solution thereof substantially free of catalyst residues.

2. A process according to claim 1 wherein said alkylene oxide contains from 2 to 8 carbon atoms and is selected from compounds of the formula

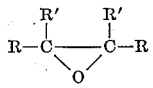

wherein each R and each R′ are selected from the group consisting of hydrogen, alkyl, cycloalkyl, aryl, epoxy-substituted alkyl, and epoxy-substituted cycloalkyl, and wherein R and R′ can be joined to form a carbocyclic group.

3. In a process for the removal of catalyst residues from polymers wherein liquid mono-1-olefin is contacted with a catalyst which forms on mixing an organometal compound and a metal salt under polymerization conditions so as to form polymers in solution wherein an effluent containing solution polymer, liquid unreacted olefin and catalyst residues is recovered from said polymerization, the improvement which comprises introducing said effluent into a contacting zone, mixing said effluent in said contacting zone with a treating agent comprising an alkylene oxide under conditions such that said olefin and polymer remain in liquid phase, passing the resulting treated effluent through a solid sorbent bed, and recovering the thus treated polymer substantially free of catalyst residues by precipitation of same from solution.

4. A process according to claim 3 wherein said alkylene oxide contains from 2 to 8 carbon atoms and is selected from compounds of the formula

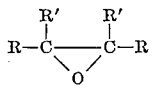

wherein each R and each R′ are selected from the group consisting of hydrogen, alkyl, cycloalkyl, aryl, epoxy-substituted alkyl, and epoxy-substituted cycloalkyl, and wherein R and R′ can be joined to form a carbocyclic group 5. A process according to claim 3 wherein said mono-1-olefin is a mixture of 1-butene and 1-hexene.

6. A process according to claim 3 wherein said mono-1-olefin is propylene.

7. In a process for the removal of catalyst residues from polymer wherein liquid mono-1-olefins are contacted with a catalyst which forms on mixing a titanium halide, an alkylaluminum halide and an aluminum halide under polymerization conditions so as to form polymers in solution form, and wherein an effluent containing solution polymer, liquid unreacted olefin, and catalyst residues is recovered from said polymerization, the improvement comprising introducing said effluent into a contact zone, mixing said effluent in said contact zone with propylene oxide under conditions such that said olefin remains in liquid phase, passing said resulting solution through a sorbent bed selected from the group consisting of bauxite and alumina, and thereafter recovering polymer substantially free of catalyst residues.

8. A method of removing catalyst residues from a polymer prepared by catalytic polymerization in the presence of a catalyst which forms on commingling at least two essential components, one of said components being a metal compound selected from the group consisting of Groups IV, V, VI and VIII metal compounds and another of said components being selected from the group consisting of organometals, metal hydrides and metals of Groups I, II and III, which consists of contacting said polymer present in solution with a treating agent comprising an alkylene oxide having from 2 to 8 carbon atoms and a dicarbonyl compound of the formulas

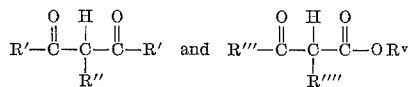

wherein R' is a member of the group consisting of alkyl, cycloalkyl, aryl, aralkyl, alkaryl, alkylcycloalkyl and cycloalkylalkyl and wherein the R's can be joined to form a cyclic structure; R'' is a member of the group consisting of hydrogen, alkyl, cycloalkyl, aryl, alkaryl, aralkyl, alkylcycloalkyl and cycloalkylalkyl; R''' is a member of the group consisting of alkyl, cycloalkyl, aryl, arakyl, alkaryl, alkylcycloalkyl, cycloalkylalkyl and an OR$^v$ group; R'''' is a member of the group consisting of hydrogen, alkyl, cycloalkyl, aryl, aralkyl, alkaryl, alkylcycloalkyl and cycloalkylalkyl; and R$^v$ is a member selected from the group consisting of alkyl, cycloalkyl, aryl, aralkyl, alkaryl, alkylcycloalkyl and cycloalkylalkyl; and wherein each of said R', R'', R''', R'''' and R$^v$ contains from 1 to 8 carbon atoms; passing the resulting treated polymer solution over a bed of an activated sorbent; and recovering the thus treated polymer from the solution thereof substantially free of catalyst residues.

9. A process according to claim 8 wherein said alkylene oxide contains from 2 to 8 carbon atoms and is selected from compounds of the formula

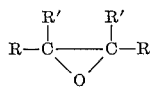

wherein each R and each R' are selected from the group consisting of hydrogen, alkyl, cycloalkyl, aryl, epoxy-substituted alkyl, and epoxy-substituted cycloalkyl, and wherein R and R' can be joined to form a carbocyclic group.

10. In a process for the removal of catalyst residues from polymers wherein liquid mono-1-olefin is contacted with a catalyst which forms on mixing an organometal compound and a metal salt under polymerization conditions so as to form polymers in solution wherein an effluent containing solution polymer, liquid unreacted olefin and catalyst residues is recovered from said polymerization, the improvement which comprises introducing said effluent into a contacting zone; mixing said effluent in said contacting zone with a treating agent comprising an alkylene oxide and a dicarbonyl compound of the formulas

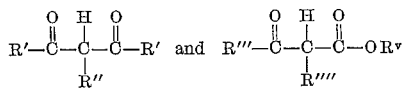

wherein R' is a member of the group consisting of alkyl, cycloalkyl, aryl, aralkyl, alkaryl, alkylcycloalkyl and cycloalkylalkyl and wherein the R's can be joined to form a cyclic structure; R'' is a member of the group consisting of hydrogen, alkyl, cycloalkyl, aryl, alkaryl, aralkyl, alkylcycloalkyl and cycloalkylalkyl; R''' is a member selected from the group consisting of alkyl, cycloalkyl, aryl, aralkyl, alkaryl, alkylcycloalkyl, cycloalkylalkyl and an OR$^v$ group; R'''' is a member of the group consisting of hydrogen, alkyl, cycloalkyl, aryl, aralkyl, alkaryl, alkylcycloalkyl and cycloalkylalkyl; and R$^v$ is a member selected from the group consisting of alkyl, cycloalkyl, aryl, aralkyl, alkaryl, alkylcycloalkyl and cycloalkylalkyl; and wherein each of said R', R'', R''', R'''' and R$^v$ contains from 1 to 8 carbon atoms under conditions such that said olefin and polymer remain in liquid phase; passing the resulting treated effluent through a solid sorbent bed; and recovering the thus treated polymer substantially free of catalyst residues by precipitation of same from solution.

11. A process according to claim 10 wherein said alkylene oxide contains from 2 to 8 carbon atoms and is selected from compounds of the formula

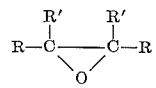

wherein each R and each R' are selected from the group consisting of hydrogen, alkyl, cycloalkyl, aryl, epoxy-substituted alkyl, and epoxy-substituted cycloalkyl, and wherein R and R' can be joined to form a carbocyclic group.

12. A process according to claim 10 wherein said mono-1-olefin is a mixture of 1-butene and 1-hexene.

13. A process according to claim 10 wherein said mono-1-olefin is propylene.

14. In a process for the removal of catalyst residues from polymer wherein liquid mono-1-olefins are contacted with a catalyst which forms on mixing a titanium halide, an alkylaluminum halide and an aluminum halide under polymerization conditions so as to form polymers in solution form, and wherein an effluent containing solution polymer, liquid unreacted olefin, and catalyst residues is recovered from said polymerization, the improvement comprising introducing said effluent into a contact zone, mixing said effluent in said contact zone with propylene oxide and acetyl acetone under conditions such that said olefin remains in liquid phase, passing said resulting solution through a sorbent bed selected from the group consisting of bauxite and alumina, and thereafter recovering polymer substantially free of catalyst residues.

References Cited by the Examiner
UNITED STATES PATENTS

| | | | |
|---|---|---|---|
| 2,890,214 | 6/1959 | Brightbill et al. | 260—94.9 |
| 2,974,132 | 3/1961 | Jacobi et al. | 260—94.9 |

JOSEPH L. SCHOFER, *Primary Examiner.*

L. EDELMAN, *Assistant Examiner.*